(12) United States Patent  
Haller

(10) Patent No.: US 7,079,023 B2  
(45) Date of Patent: Jul. 18, 2006

(54) ACTIVE OBJECT IDENTIFICATION AND DATA COLLECTION

(75) Inventor: Stephan Haller, Karlsruhe (DE)

(73) Assignee: SAP Aktiengesellschaft, Walldorf ( * ) Notice: Subject to any disclaimer, the term of this patent is extended or adjusted under 35 U.S.C. 154(b) by 168 days.

(21) Appl. No.: 10/307,498

(22) Filed: Dec. 2, 2002

(65) Prior Publication Data

US 2004/0075549 A1    Apr. 22, 2004

Related U.S. Application Data

(60) Provisional application No. 60/415,774, filed on Oct. 4, 2002.

(51) Int. Cl.  
*G08B 19/00* (2006.01)

(52) U.S. Cl. .................. 340/522; 340/506; 340/572.1; 700/115; 705/28

(58) Field of Classification Search ............. 340/572.1, 340/568.1, 666, 522, 506, 5.92, 870.11, 870.16, 340/539.22–539.25; 348/161; 235/385, 235/487, 435; 700/115, 116; 705/28; 40/625; 283/74; 177/25.11, 25.12, 25.1; 209/576, 209/592

See application file for complete search history.

(56) References Cited

U.S. PATENT DOCUMENTS

| | | | |
|---|---|---|---|
| 4,974,166 A | 11/1990 | Maney et al. | |
| 5,166,884 A | 11/1992 | Maney et al. | |
| 5,469,363 A | 11/1995 | Saliga | |
| 5,834,706 A | 11/1998 | Christ ........................... 177/1 |
| 5,910,765 A * | 6/1999 | Slemon et al. .............. 340/522 |
| 5,936,527 A | 8/1999 | Isaacman et al. | |
| 5,963,134 A | 10/1999 | Bowers et al. | |
| 5,971,592 A | 10/1999 | Kralj et al. | |
| 6,032,127 A | 2/2000 | Schkolnick et al. | |
| 6,177,860 B1 | 1/2001 | Cromer et al. | |
| 6,195,006 B1 | 2/2001 | Bowers et al. | |
| 6,259,367 B1 | 7/2001 | Klein | |
| 6,392,536 B1 * | 5/2002 | Tice et al. ................... 340/522 |
| 6,567,162 B1 * | 5/2003 | Koren et al. .............. 356/237.2 |
| 6,641,042 B1 | 11/2003 | Pierenkemper et al. 235/462.01 |
| 6,643,608 B1 * | 11/2003 | Hershey et al. .............. 340/673 |
| 2001/0000019 A1 | 3/2001 | Bowers et al. | |
| 2003/0023337 A1 * | 1/2003 | Godfrey et al. ............. 700/115 |
| 2003/0137968 A1 * | 7/2003 | Lareau et al. ............... 370/349 |

FOREIGN PATENT DOCUMENTS

| | | |
|---|---|---|
| DE | 4341880 | 6/1995 |
| DE | 19623893 | 12/1997 |

(Continued)

*Primary Examiner*—Thomas Mullen  
(74) *Attorney, Agent, or Firm*—Fish & Richardson P.C.

(57) ABSTRACT

Implementations are disclosed for operating a multi-sensor system. A plurality of sensors each output data, via a common interface, to a resolver that is also communicating with the interface. The resolver groups the output data with respect to a particular object, and aggregates the output data according to rules and information stored about the object in a database. In this way, the multi-sensor system may obtain information about the object, such as its identity, status, or location. The multi-sensor system is extremely accurate and reliable, since it can infer accuracy from a plurality of independent sensors, and is operable even when one or more sensors fails or malfunctions. Moreover, the multi-sensor system is flexible, and can activate, de-activate, or adjust any one of the sensors depending on, for example, a need for or cost of the sensor. Additional sensors can easily be added on an as-needed basis, due to the common interface and the flexible nature of the resolver and the database.

32 Claims, 4 Drawing Sheets

FOREIGN PATENT DOCUMENTS

| | | |
|---|---|---|
| DE | 19844631 | 4/2000 |
| DE | 19951060 | 5/2000 |
| DE | 19955120 | 5/2001 |
| EP | 0908643 | 4/1999 |
| GB | 2308947 | 7/1997 |
| WO | 00/45324 | 8/2000 |
| WO | WO 00 59648 | 10/2000 |
| WO | 02/47014 | 6/2002 |

\* cited by examiner

ACTIVE OBJECT IDENTIFICATION AND DATA COLLECTION

CROSS-REFERENCE TO RELATED APPLICATIONS

This application is a utility application of and claims priority to U.S. Provisional Application Ser. No. 60/415,774, filed on Oct. 4, 2002.

TECHNICAL FIELD

This description relates to the use of sensors in the active identification of objects and/or collection of data.

BACKGROUND

Conventional systems exist which attempt to identify objects and/or collect data about the objects. For example, inventory-control systems attempt to identify objects being input to, stored in, or output from, for example, an inventory warehouse. Such identification may include attempts to determine whether the objects have been tampered with or otherwise damaged. Similarly, in a manufacturing environment, it is desirable to know whether an object's actual state of assembly matches its desired state of assembly, during a given point in the assembly process. Many other examples of situations exist in which it is necessary or desirable to obtain an identification of an object, and/or data about the object.

Various sensors exist which allow automated or assisted collection of information that may be useful in the above scenarios. For example, Radio Frequency Identification ("RFID") tags may be attached to the object in question, and an electronic interrogator may be used to read information about the object from the RFID tag. Similarly, cameras, weight scales, temperature and pressure sensors, and various other sensors exist which assist in the collection of data about a particular object.

SUMMARY

According to one general aspect, an implementation may include a first information set related to an object detected at a first sensor, and a second information set related to the object detected at a second sensor. The first information set and the second information set are aggregated to obtain an aggregated information set, and the aggregated information set is compared to an expected information set for the object.

Implementations may include one or more of the following features. For example, when aggregating the first information set and the second information set, the first information set and the second information set may be associated with the object based on a first time at which the first information set was detected and a second time at which the second information set was detected. Also when aggregating the first information set and the second information set, a first portion of the first information set may be determined to be redundant to a second portion of the second information set, and the second portion may be discarded. Also when aggregating the first information set and the second information set, a malfunction of the first sensor may be determined, and the first information set may be discarded.

Also when aggregating the first information set and the second information, a predetermined set of aggregation rules may be applied to the first information set and the second information set. In this case, the aggregation rules may dictate a priority of the first information set over the second information set.

In comparing the aggregated information set, an identity of the object may be provided. In comparing the aggregated information set, a conflict between the aggregated information set and the expected information set may be detected. In this case, a conflict resolution for removing the conflict may be performed. Further in this case, in performing the conflict resolution, an inconsistency between the first information set and the second information set may be determined, and the first information set may be discarded, based on a predetermined rule that prioritizes the second information set over the first information set. Alternatively, in performing the conflict resolution, a human inspection of the object may be performed, and/or the object may be discarded.

In comparing the aggregated information set, additional information may be determined to be required. In this case, a third sensor may be activated, and a third information set may be detected at the third sensor. The third information set may be included within a modified aggregated information set, and the modified aggregated information set may be compared to the expected information set. Alternatively, the first sensor may be adjusted, and a modified first information set may be detected at the first sensor. The modified first information set may be included within a modified aggregated information set, and the modified aggregated information set may be compared to the expected information set.

According to another general aspect, a system may include a first sensor operable to sense an object and output a first information set related to the object, a second sensor operable to sense the object and output a second information set related to the object, an interface operable to input the first information set and the second information set, a database containing characterization data characterizing the object, and a resolver operable to input, via the interface, the first information set and the second information set, aggregate the first information set and the second information set into an aggregated information set, and compare the aggregated information set to the characterization data.

Implementations may include one or more of the following features. For example, the resolver may include a sensor control system operable to control an operation of the first sensor. The resolver may include a sensor behavior system operable to track sensor information regarding an accuracy and reliability of the first sensor and the second sensor. The resolver may be further operable to associate the first information set and the second information set with the object based on a first time at which the first information set was detected and a second time at which the second information set was detected.

The resolver may be further operable to determine that a first portion of the first information set is redundant to a second portion of the second information set, and thereafter discard the second portion. The resolver may be further operable to determine a malfunction of the first sensor, and thereafter discard the first information set.

The resolver may be further operable to apply a predetermined set of aggregation rules to the first information set and the second information set. In this case, the aggregation rules may dictate a priority of the first information set over the second information set. The resolver may be further operable to provide an identity of the object based on the comparing of the aggregated information set to the characterization data.

The resolver may be further operable to detect a conflict between the aggregated information set and the expected information set. In this case, the resolver may be further operable to perform a conflict resolution for removing the conflict. Further in this case, the resolver may perform the conflict resolution by determining an inconsistency between the first information set and the second information set, and discarding the first information set, based on a predetermined rule that prioritizes the second information set over the first information set. Alternatively, the resolver may perform the conflict resolution by requesting a removal of the object for a human inspection thereof. The resolver may perform the conflict resolution by outputting an instruction to discard the object.

The resolver, in comparing the aggregated information set to the characterization data, may determine that additional information is required. In this case, a third sensor operable to detect a third information set may be included, wherein the resolver is further operable to include the third information set within a modified aggregated information set, and compare the modified aggregated information set to the expected information set. Alternatively, the resolver may be further operable to output instructions for adjusting the first sensor, input, via the interface, a modified first information set from the first sensor, include the modified first information set within a modified aggregated information set, and compare the modified aggregated information set to the expected information set.

According to another general aspect, an apparatus includes a storage medium having instructions stored thereon, and the instruction include a first code segment for inputting multiple data sets from a plurality of sensors, a second code segment for associating the multiple data sets with an object, a third code segment for applying a set of aggregation rules to the multiple data sets, to thereby obtain an aggregation set, and a fourth code segment for comparing the aggregation set to an expected data set associated with the object.

Implementations may include one or more of the following features. For example, a fifth code segment may be for detecting a conflict between the aggregation set and the expected data set. In this case, a sixth code segment may be for performing a conflict resolution for removing the conflict. Further in this case, the sixth code segment may include a seventh code segment for determining an inconsistency between a first data set output by a first sensor from among the plurality of sensors and a second data set output by a second sensor from among the plurality of sensors, and an eighth code segment for discarding the data set, based on a predetermined rule that prioritizes the second data set over the first data set. Alternatively, the sixth code segment may include a seventh code segment for outputting an instruction to discard the object.

The fourth code segment may determine that additional information is required. In this case, a fifth code segment may be for inputting an additional data set from a sensor not from among the plurality of sensors, a sixth code segment may be for including the additional data set within a modified aggregation set, and a seventh code segment may be for comparing the modified aggregation set to the expected data set. Alternatively, a fifth code segment may be for outputting instructions for adjusting a first sensor from among the plurality of sensors, a sixth code segment may be for inputting a modified first data set from the first sensor, a seventh code segment for including the modified first data set within a modified aggregation set, and an eighth code segment may be for comparing the modified aggregation set to the expected data set.

The details of one or more implementations are set forth in the accompanying drawings and the description below. Other features will be apparent from the description and drawings, and from the claims.

DETAILED DESCRIPTION

Figure 1:
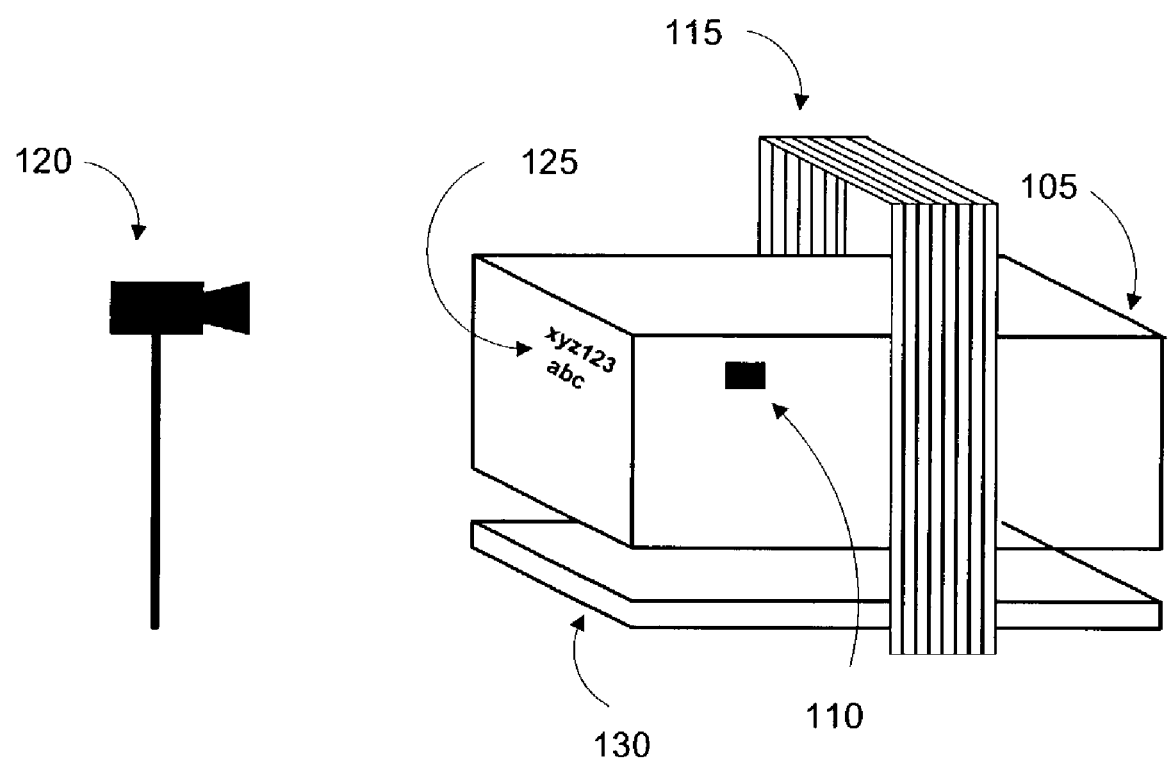
FIG. 1 is an illustration of an environment in which various implementations may be used.

FIG. 1 is an illustration of an environment in which various implementations may be used. In FIG. 1, information about a box 105 may be obtained by a plurality of sensors. For example, an RFID tag 110 is attached to the box 105, and read by an RFID gate 115. As mentioned above, such an RFID sensor system allows many types of information about box 105 to be determined, including, for example, an identifying number or code, a source or destination of the box 105, or content of the box 105.

A camera 120 positioned in proximity to the RFID gate 115 obtains an image of the box 105, and thereby also provides relevant information to a user. For example, in FIG. 1, the camera 120 is used to input an identifying number or code 125 that is printed on the box 105. Camera 120 also may provide, for example, a color or size of the box 105, or, more generally, may provide image data for further processing. Data from the camera can be obtained in text or numerical form by utilizing a standard image recognition software.

Finally in the example of FIG. 1, a weight scale 130 is used to provide a weight of the box 105. Many other types of sensors, such as bar code scanners, temperature sensors, audio sensors, pressure sensors, vibration sensors or humidity sensors, also may be used in the system of FIG. 1, and many other objects besides box 105 may be sensed.

Figure 2:
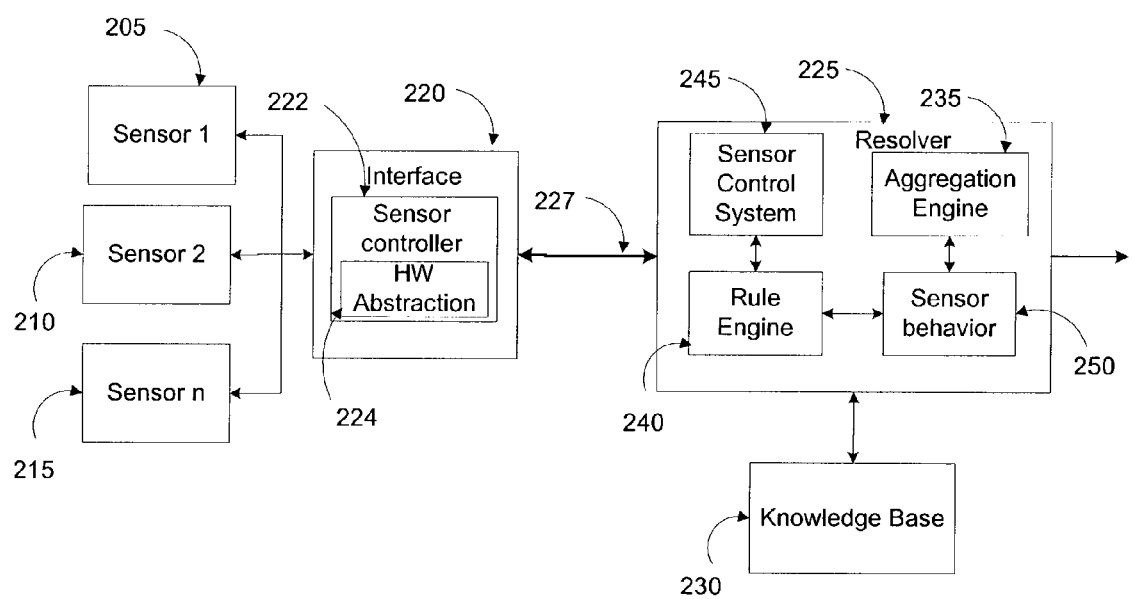
FIG. 2 is a block diagram of a multi-sensor system.

FIG. 2 is a block diagram of a multi-sensor system 200. As discussed below, the multi-sensor system 200 provides a synergy between a plurality of sensors, which allows system 200 to obtain more and/or more accurate information about an object such as box 105 than could otherwise be obtained by conventional, single-sensor systems. As should be clear from the above discussion with respect to FIG. 1, the term "sensor" should be understood to mean any device or technique which inputs information about an object, and outputs the information in some format.

In system 200, a plurality of sensors 205, 210, and 215 independently provide data about an object or a class of objects. Conventional sensors often provide their respective outputs in a pre-determined format. For example, camera 120 may output data as a Joint Photographic Experts Group ("JPEG") file, or as a Moving Picture Experts Group ("MPEG") file. Other sensors may output data as numerical data, using a particular file type or formatting preference. Similarly, the sensors 205, 210, and 215 also may input operational commands using different command languages, file types, or formatting preferences.

In FIG. 2, all of the sensors 205, 210, and 215 are connected to an interface 220. Interface 220 may be, for example, an interface that is generically capable of communicating with all of the sensors 205, 210, and 215, as well as with any number of other sensors, as needed, while taking into consideration whatever output formatting differences may exist. The interface 220 may be written as, for example, an Extensible Mark-up Language ("XML") file capable of interacting with any type of sensor that might be used within system 200. Sensors to be used within system 200 also may be modified prior to their use in the system 200, as needed, to ensure that they are interoperable with the interface 220.

A sensor controller 222 may be implemented as part of the interface 220 that interacts with the sensors 205, 210, or 215 through a hardware abstraction layer 224, for example that acts as a proxy for the sensor(s). Such sensor controller(s) 222 also may be implemented directly in the sensors 205, 210, 215 themselves (not shown). In this latter case, the sensors 205, 210, 215 may act in a "plug-and-play" manner, in which the sensors 205, 210, 215 can be discovered, configured, and controlled through the network immediately upon being attached to the network.

The interface 220 communicates with a resolver 225 to transmit data pertaining to the various sensors. More specifically, the resolver 225, as discussed in more detail below, is generally operable to aggregate some or all of the data from the sensors 205, 210, and 215. By aggregating the data, more and/or more accurate information about a sensed object can be easily, quickly, and reliably obtained than if only one of the sensors 205, 210, or 215 were used, or if data from the various sensors were considered separately.

The resolver 225 may interact with the interface 220 through, for example, a high-speed, local information bus 227 that may be based on a publish/subscribe or point-to-point communication model. In the case where the sensor controller(s) 222 are implemented within the sensors 205, 210, and 215 themselves, the resolver 225 may be connected to the sensors directly through the local information bus 227. In cases where, for example, real-time requirements are in place, it may be desirable to connect the resolver to the sensors 205, 210, and 215 through, for example, a serial port or specialized network connection (not shown). In the latter two examples, some or all of interface 220 may be considered to be implemented within the resolver 225.

The resolver 225 combines and/or analyzes the sensor data based on information contained within a knowledge base 230. Knowledge base 230 may contain, for example, technical information about each of the sensors 205, 210, and 215, or information about what types of objects expected to be sensed, or information about characteristics of objects to be sensed. Knowledgebase 230 may be implemented using, for example, a relational database.

The resolver 225, in the implementation of system 200, combines data from the sensors 205, 210, and 215 using an aggregation engine 235. The aggregation engine 235 may use different techniques or combinations of techniques to aggregate the sensor data. For example, in situations such as the one shown in FIG. 1, in which an object is detected at essentially the same time by all of a plurality of sensors, the aggregation engine 235 may assign a time stamp to each sensor output, and group the sensor data according to the time stamp. Somewhat similarly, if the object is on, for example, a conveyor belt, and passes each of the various sensors according to some predetermined time interval corresponding to a speed of the conveyor belt, then the aggregation engine may assign a time stamp to outputs from the sensors 205, 210, and 215 that are spaced, for example, ten seconds apart on the belt.

Additionally, the aggregation engine 235 may aggregate sensor data based on the locations of the sensors 205, 210, and 215. For example, data from all sensors within a particular room may be grouped together. This technique may be useful for ensuring that all objects at the location are properly included within a specific object class. Moreover, the location information can be used in conjunction with the time information, in whatever manner is necessary to correlate the sensor outputs and obtain the desired information about the object being sensed. In aggregating the sensor data, aggregation engine 235 may discard any information which is determined to be redundant.

The resolver 225 also may include a rule engine 240. The rule engine 240 is operable to input the aggregated sensor data and apply a plurality of rules, based on information contained within knowledgebase 230, in order to determine a desired piece of information about the object, such as its identity or whether it has been tampered with or damaged.

Rule engines of various types exist in other contexts. For example, rule engines are often used to implement business rules representing business policies in applications including marketing strategies, pricing policies, product and service offerings, customer relationship management practices, and workflow management. Such rule engines may be written in a programming language such as Prolog, and are generally designed to implement assertions with preconditions. In other words, if all of a set of preconditions are met, then the assertion is determined to be true.

The rule engine 240 may operate in a somewhat similar manner, but serves to make inferences and judgments about the aggregated sensor data with respect to the sensed object(s), based on information contained in knowledgebase 230. For example, the rule engine 240 may know from knowledgebase 230 that a package having a certain identity (for example, a television in a box) should have a certain weight. If the rule engine 240 determines, using the aggregated sensor data from aggregation engine 235, that the camera 120 and the RFID reader 115 indicate that a television box is on the scale 130 that weighs significantly less than the expected value, then various responses can be indicated by the rule engine 240 (e.g., removing the box for human inspection, activating other sensors to double-check the result, and other actions described in more detail below with respect to FIGS. 3 and 4).

Some of the responses indicated by rule engine 240 may involve adjusting, activating, or deactivating one of the sensors 205, 210, or 215. In this case, resolver 225 also contains a sensor control system 245 which outputs the necessary commands to the particular sensor(s). More specifically, the sensor control system 245 may control the sensors 205, 210, and 215 by, in the example of FIG. 2, interacting with the sensor control device 222 associated with the interface 220. Examples of uses of the sensor control system are discussed in more detail below with respect to FIG. 4.

The rule engine 240 also may consider the number or type of sensor when analyzing the sensor data. For example, data from the camera 120 may generally be considered more reliable with respect to a certain characteristic than data from scale 130 (for example, whether the object has been tampered with). Therefore, if there is a conflict between these two sensors with respect to that characteristic, the rule engine 240 may prioritize the camera data. In other words, the rule engine 240 may weight the camera data more heavily, or may discard the scale data entirely. As another example, if the rule engine is comparing data from ten different sensors, a particular characteristic of an object may be determined as an average of data obtained from the sensors. Alternatively, the rule engine may determine that one sensor is outputting results that are inconsistent with the nine remaining sensors, and therefore discard the outlying result.

It should be understood that some of the functionality of determining which sensor data to use or discard, or how to combine the sensor data with respect to a reliability of a particular sensor in a particular situation, could similarly be performed in the aggregation engine 235. Generally speaking, however, the aggregation engine 235 may be more suited to utilize such factors with respect to the sensors and without comparable regard for the particular object currently being detected. In other words, aggregation engine 235 may be more suited for calculations that are broadly applicable to the available sensor array, whereas rule engine 240 may be more suited for situation or object-specific determinations.

In analyzing sensor data, a sensor behavior system 250 also may be utilized. Sensor behavior system 250 determines information about particular sensors that may be used by aggregation engine 235 and/or rule engine 240 in performing their respective functions. Sensor behavior system 250 may, or example, compile statistics about individual sensors, such as the number of times data from a particular sensor was discarded due to inconsistencies between that sensor data and simultaneously-collected sensor data, as determined by aggregation engine 235 and/or rule engine 240.

By performing such statistical analysis on the sensor data, sensor behavior system 250 may allow resolver 225 to learn and improve its performance over time, and/or may allow resolver 225 to alert an operator for system maintenance. For example, if sensor behavior system 250 determines that sensor 205 has provided inaccurate or unusable data for the last five sensing operations, then the sensor behavior system 250 may alert an operator to remove sensor 205 for repair or replacement.

It should be understood that sensor behavior system 250 may employ techniques aside from statistical analysis. For example, the sensor behavior system 250 may utilize Artificial Intelligence ("AI") techniques and/or agent technology to learn about and/or modify the sensors' behavior over time.

Rules in rule engine 240 for comparing aggregated sensor data from aggregation engine 235 to expected results stored in knowledgebase 230 may vary greatly in terms of number and complexity. Some of the quantity and complexity of the rules can be, in effect, implemented within knowledgebase 230, depending on the capabilities of the particular rule engine 240 being utilized.

For example, in a simple form, knowledgebase 230 may simply be a database listing expected items and their expected characteristics. In this case, rule engine 240 would require many rules to determine what to do if one or more of the expected characteristics is missing or inaccurate. In a different example, knowledgebase 230 may contain many variations of expected characteristics for expected objects, possibly along with explicit instructions as to what to do in each situation. In this latter example, rule engine 240 would, in most cases, simply have to determine which of the variations of the expected values exists with respect to current sensor data, and implement the knowledgebase 230 instructions accordingly.

Figure 3:
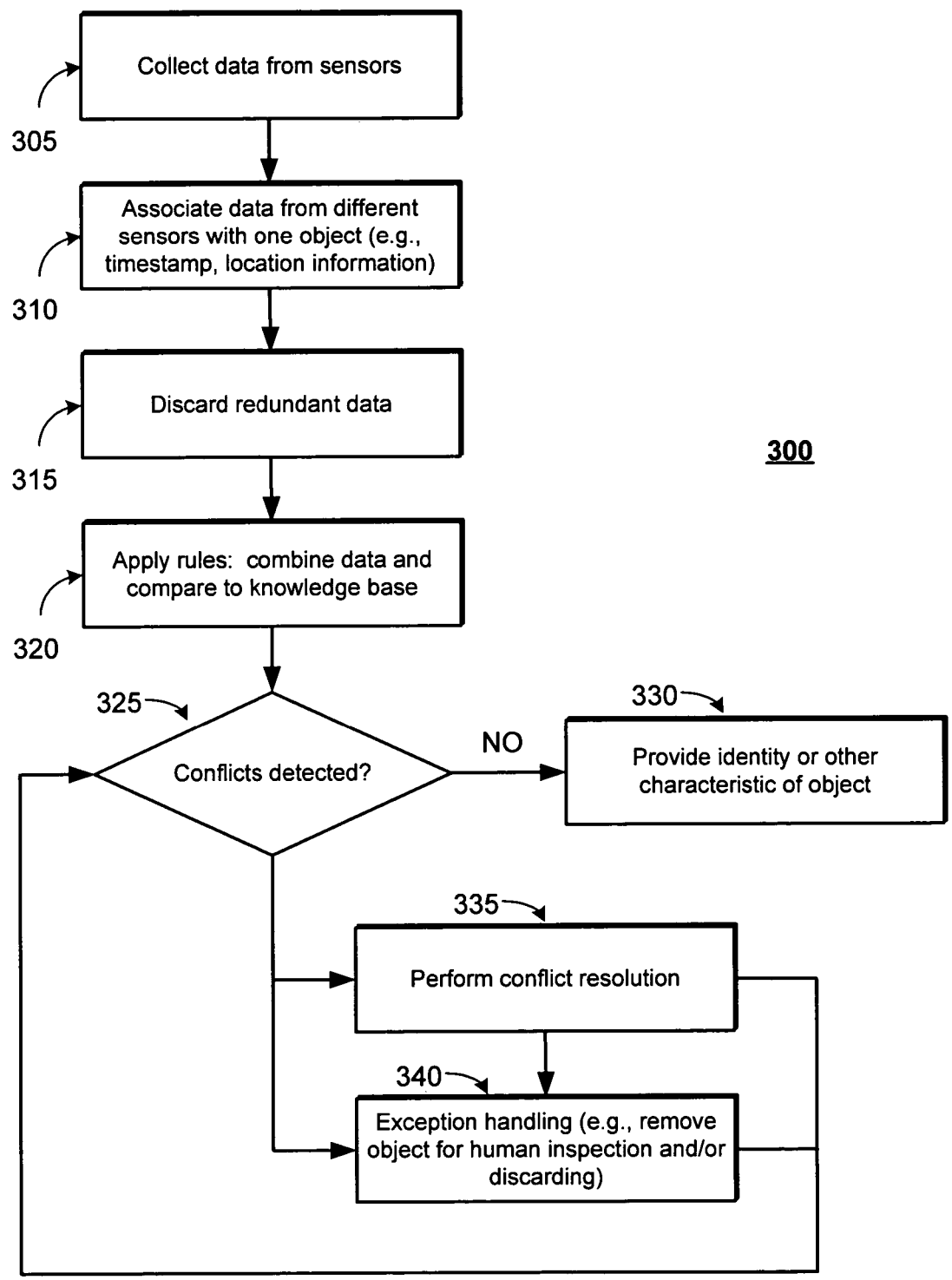
FIG. 3 is a flowchart illustrating a first process flow for using the multi-sensor system of FIG. 2.

FIG. 3 is a flowchart describing a first process flow 300 for using the multi-sensor system 200 of FIG. 2. In FIG. 3, the general situation is considered in which rule engine 240 determines that a conflict or other problem exists in analyzing the sensor data. In process 300, data is collected from the plurality of sensors represented in FIG. 2 by sensors 205, 210, and 215, but may include more or less sensors (305). Next, data from the different sensors is grouped together by aggregation engine 235, by, for example, a timestamp indicating the data was obtained simultaneously (310). Data from the different sensors that is redundant is discarded (315).

Once the sensor data has been appropriately combined, rules may be applied accordingly by rule engine 240 (320). Rule application may include, as discussed in more detail above, further refining of the available data and a comparison of the data to expected values contained in the knowledgebase 230.

Rule engine 240 next analyzes the sensor data for conflicts (325). If no conflicts between the sensor data and the expected values in knowledgebase 230 exist, then the sensor data is deemed reliable and an identity or other characteristic of the sensed object is output (330). If conflicts do exist, then a number of options may be implemented. For example, a conflict resolution process may be started (335).

Conflict resolution involves several different options. For example, if the conflict is one sensor providing outlying data with respect to a number of other sensors, then a conflict resolution may be to simply discard the outlying data. This solution may be supported by, for example, data from sensor behavior system 250 indicating that the sensor in question has had low reliability ratings. As another example, if possible (e.g., if the object is still in an appropriate physical location), the sensor control system 245 may be activated in order to instruct the sensor in question to re-obtain the disputed data, or to adjust the sensor to obtain the same data in a different manner (for example, re-adjusting a camera to focus on a different portion of the object).

In addition to, or alternatively from, conflict resolution is the process of exception handling (340). In exception handling, it is determined that a problem may exist with the object itself, as opposed to the sensors. In this case, the object may be removed for human inspection, at which point it may be repaired and replaced, or discarded.

Figure 4:
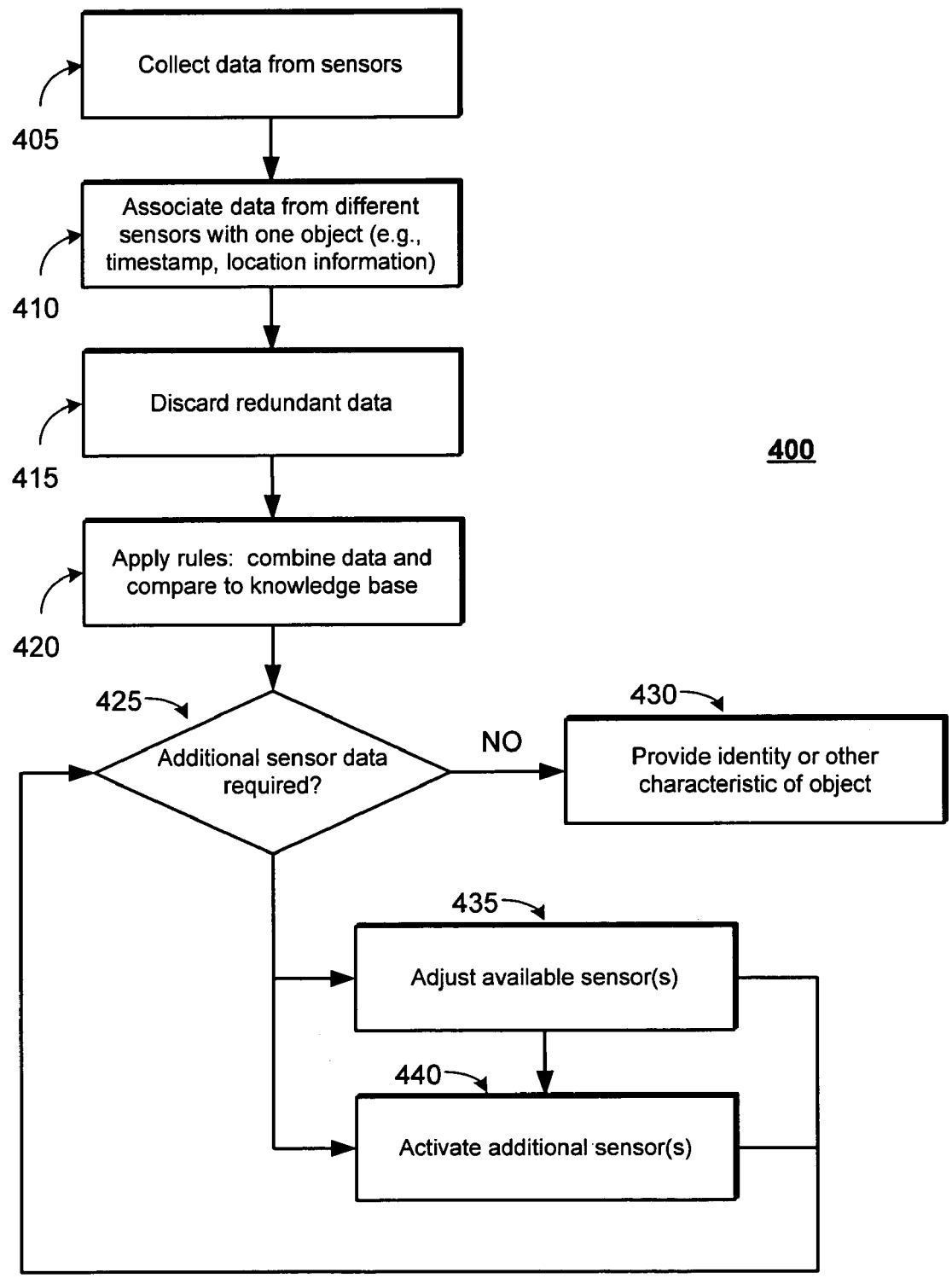
FIG. 4 is a flowchart illustrating a second process flow for using the multi-sensor system of FIG. 2.

FIG. 4 is a flowchart illustrating a second process flow 400 for using the multi-sensor system 200 of FIG. 2. In FIG. 3, process 300 is primarily designed to deal with situations where there is a real or perceived problem with an object and/or the sensors sensing the object. Even in situations where there is no such conflict, however, system 200 provides flexibilities and abilities to save money and/or time in a sensing process (of course, these flexibilities and abilities may also be applied and utilized in conflict situations, as well).

For example, in FIG. 4, data is collected from the plurality of sensors represented in FIG. 2 by sensors 205, 210, and 215, but may include more or less sensors (405). Next, data from the different sensors is grouped together by aggregation engine 235, by, for example, a timestamp indicating the data was obtained simultaneously (410). Data from the different sensors that is redundant is discarded (415).

Once the sensor data has been appropriately combined, rules may be applied accordingly by rule engine 240 (420). Rule application may include, as discussed in more detail above, further refining of the available data and a comparison of the data to expected values contained in the knowledgebase 230.

Rule engine 240 next determines whether additional sensor data is required (425). If no additional data is required, then an identity of or other characteristic of the object may be output (430).

Additional sensor data may be needed for a variety of reasons. For example, a rule may exist that certain objects require additional sensor data, in order to improve accuracy in sensing those objects (e.g., some objects sensed by a camera may require different or more specific focusing of the camera). This additional sensor data may only be required in specific instances, such as particular environmental conditions (e.g., in inadequate lighting, a camera may require that its contrast be adjusted to improve image accuracy, or, in warm environments, a temperature sensor may be activated to check that an object's temperature is being maintained below a pre-determined level).

As another example, some sensors may be relatively more expensive to utilize, and so may only be activated when necessary, such as when additional information about a particular object is needed. In this way, for example, an expensive sensor such as a camera can be shared between a plurality of sensing situations, rather than requiring a separate camera for each of the situations.

As yet another example, some sensors are slower to operate than others, and so speed in a sensing process may be obtained by only activating the slower sensors for certain objects or in certain situations.

Thus, once it is determined that additional sensor data is needed, sensors may be adjusted in order to obtain that data (435). Additionally, or alternatively, additional sensors, not previously used in the process at all, may be activated in order to supplement the available data (440). Activation may include a command from sensor control system 245, or may include actual physical relocation of a new sensor into the sensor array. In the latter example, it should be understood that adding a new sensor is particularly convenient in the implementations associated with system 200 of FIG. 2. That is, since additional sensors may all be compatible with the generic interface 220, and depending on the individual configurations of the sensors, the sensors may attach to the interface 220 in a "plug-and-play" manner, as described above. Depending on the type of sensor and the current state of the knowledgebase 230, an update to the knowledgebase 230 may also be required.

In conclusion, the above description has provided techniques for using a multi-sensor system to quickly, accurately, inexpensively, and reliably identify objects or object characteristics. Moreover, the techniques easily allow tradeoffs between these characteristics for situations in which one of the characteristics is very important. For example, accuracy can be improved to the detriment of speed and expense by activating additional sensors. Such adaptability is facilitated by the ease with which sensors can be added or removed from the system.

A number of implementations have been described. Nevertheless, it will be understood that various modifications may be made. Accordingly, other implementations are within the scope of the following claims.

What is claimed is:

1. A method comprising:
   detecting, at a first sensor, a first information set related to an object;
   detecting, at a second sensor, a second information set related to the object;
   aggregating the first information set and the second information set to obtain an aggregated information set by associating the first information set and the second information set with the object based on a first time at which the first information set was detected and a second time at which the second information set was detected; and
   comparing the aggregated information set to an expected information set for the object and providing an identity of the object based on the comparing of the aggregated information set to the expected information set for the object.

2. The method of claim 1 in which aggregating the first information set and the second information set comprises:
   determining that a first portion of the first information set is redundant to a second portion of the second information set; and
   discarding the second portion.

3. The method of claim 1 in which aggregating the first information set and the second information set comprises:
   determining a malfunction of the first sensor; and
   discarding the first information set.

4. The method of claim 1 in which aggregating the first information set and the second information set comprises applying a predetermined set of aggregation rules to the first information set and the second information set.

5. The method of claim 4 in which the aggregation rules dictate a priority of the first information set over the second information set.

6. The method of claim 1 in which comparing the aggregated information set comprises detecting a conflict between the aggregated information set and the expected information set.

7. The method of claim 6 further comprising performing a conflict resolution for removing the conflict.

8. The method of claim 7 in which performing the conflict resolution comprises:
   determining an inconsistency between the first information set and the second information set; and
   discarding the first information set, based on a predetermined rule that prioritizes the second information set over the first information set.

9. The method of claim 7 in which performing the conflict resolution comprises performing a human inspection of the object.

10. The method of claim 7 in which performing the conflict resolution comprises discarding the object.

11. The method of claim 1 in which comparing the aggregated information set comprises determining that additional information is required.

12. The method of claim 11 further comprising:
    activating a third sensor;
    detecting, at the third sensor, a third information set;
    including the third information set within a modified aggregated information set; and
    comparing the modified aggregated information set to the expected information set.

13. The method of claim 11 further comprising:
    adjusting the first sensor;
    detecting, at the first sensor, a modified first information set;
    including the modified first information set within a modified aggregated information set; and
    comparing the modified aggregated information set to the expected information set.

14. A system comprising:
    a first sensor operable to sense an object and output a first information set related to the object;
    a second sensor operable to sense the object and output a second information set related to the object;
    an interface operable to input the first information set and the second information set;
    a database containing characterization data characterizing the object; and
    a resolver operable to input, via the interface, the first information set and the second information set, aggregate the first information set and the second information set into an aggregated information set, compare the aggregated information set to the characterization data, and provide an identity of the object based on the comparing of the aggregated information set to the characterization data, the resolver including a sensor control system operable to control an operation of the first sensor.

15. The system of claim 14 wherein the resolver further comprises a sensor behavior system operable to track sensor information regarding an accuracy and reliability of the first sensor and the second sensor.

16. The system of claim 14 in which the resolver is further operable to associate the first information set and the second information set with the object based on a first time at which the first information set was detected and a second time at which the second information set was detected.

17. The system of claim 14 in which the resolver is further operable to determine that a first portion of the first information set is redundant to a second portion of the second information set, and thereafter discard the second portion.

18. The system of claim 14 in which the resolver is further operable to determine a malfunction of the first sensor, and thereafter discard the first information set.

19. The system of claim 14 in which the resolver is further operable to apply a predetermined set of aggregation rules to the first information set and the second information set.

20. The system of claim 19 in which the aggregation rules dictate a priority of the first information set over the second information set.

21. The system of claim 14 in which the resolver is further operable to detect a conflict between the aggregated information set and the expected information set.

22. The system of claim 21 in which the resolver is further operable to perform a conflict resolution for removing the conflict.

23. The system of claim 22 in which the resolver performs the conflict resolution by:
    determining an inconsistency between the first information set and the second information set; and
    discarding the first information set, based on a predetermined rule that prioritizes the second information set over the first information set.

24. The system of claim 22 in which the resolver performs the conflict resolution by requesting a removal of the object for a human inspection thereof.

25. The system of claim 22 in which the resolver performs the conflict resolution by outputting an instruction to discard the object.

26. The system of claim 14 in which the resolver, in comparing the aggregated information set to the characterization data, determines that additional information is required.

27. The system of claim 26, further comprising a third sensor operable to detect a third information set, wherein the resolver is further operable to include the third information set within a modified aggregated information set, and compare the modified aggregated information set to the expected information set.

28. The system of claim 26 in which the resolver is further operable to:
    output instructions for adjusting the first sensor;
    input, via the interface, a modified first information set from the first sensor;
    include the modified first information set within a modified aggregated information set; and
    compare the modified aggregated information set to the expected information set.

29. An apparatus comprising a storage medium having instructions stored thereon, the instructions including:
    a first code segment for inputting multiple data sets from a plurality of sensors;
    a second code segment for associating the multiple data sets with an object;
    a third code segment for applying a set of aggregation rules to the multiple data sets, to thereby obtain an aggregation set;
    a fourth code segment for comparing the aggregation set to an expected data set associated with the object and determining that additional data is required based on the comparing of the aggregation set to the expected data set associated with the object;
    a fifth code segment for detecting a conflict between the aggregation set and the expected data set;
    a sixth code segment for performing a conflict resolution for removing the conflict;
    a seventh code segment for determining an inconsistency between a first data set output by a first sensor from among the plurality of sensors and a second data set output by a second sensor from among the plurality of sensors; and
    an eighth code segment for discarding the first data set, based on a predetermined rule that prioritizes the second data set over the first data set.

30. The system of claim 29 in which the sixth code segment comprises a ninth code segment for outputting an instruction to discard the object.

31. The system of claim 29 further comprising:
    a ninth code segment for inputting an additional data set from a sensor not from among the plurality of sensors;
    a tenth code segment for including the additional data set within a modified aggregation set; and
    an eleventh code segment for comparing the modified aggregation set to the expected data set.

32. An apparatus comprising a storage medium having instructions stored thereon, the instructions including:
    a first code segment for inputting multiple data sets from a plurality of sensors;
    a second code segment for associating the multiple data sets with an object;
    a third code segment for applying a set of aggregation rules to the multiple data sets, to thereby obtain an aggregation set;
    a fourth code segment for comparing the aggregation set to an expected data set associated with the object and determining that additional data is required based on the comparing of the aggregation set to the expected data set associated with the object;
    a fifth code segment for outputting instructions for adjusting a first sensor from among the plurality of sensors;
    a sixth code segment for inputting a modified first data set from the first sensor;
    a seventh code segment for including the modified first data set within a modified aggregation set; and
    an eighth code segment for comparing the modified aggregation set to the expected data set.

* * * * *